United States Patent
Lu et al.

(10) Patent No.: US 11,946,617 B1
(45) Date of Patent: Apr. 2, 2024

(54) INDUSTRIAL EMERGENCY LIGHTING DEVICE HAVING STORAGE MODE TRIGGERING CIRCUIT

(71) Applicant: Xiamen PVTECH Co., Ltd., Fujian (CN)

(72) Inventors: Fuxing Lu, Fujian (CN); Guohua Zhou, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 0 days.

(21) Appl. No.: 18/216,611

(22) Filed: Jun. 30, 2023

(30) Foreign Application Priority Data

Jan. 16, 2023 (CN) .......................... 202310067989.7

(51) Int. Cl.
*F21S 9/02* (2006.01)
*F21Y 115/10* (2016.01)
*H02J 9/02* (2006.01)

(52) U.S. Cl.
CPC ................. *F21S 9/022* (2013.01); *H02J 9/02* (2013.01); *F21Y 2115/10* (2016.08)

(58) Field of Classification Search
CPC ............... F21S 9/022; H02J 9/02; H02J 9/065
See application file for complete search history.

(56) References Cited

U.S. PATENT DOCUMENTS

| | | | | |
|---|---|---|---|---|
| 2005/0135103 A1* | 6/2005 | Evans | ................ | H01R 13/7175 362/276 |
| 2014/0265845 A1* | 9/2014 | Williams | ............... | H05B 47/17 315/86 |
| 2015/0155743 A1* | 6/2015 | Noguchi | ................ | H02J 9/065 307/23 |
| 2017/0051886 A1* | 2/2017 | Liu | ........................ | H05B 45/10 |
| 2018/0062425 A1* | 3/2018 | Frankland | ............. | H02J 7/0068 |
| 2018/0368223 A1* | 12/2018 | Johnson | ................ | H05B 45/00 |
| 2021/0226475 A1* | 7/2021 | Zhou | .................... | H05B 45/345 |

* cited by examiner

*Primary Examiner* — William N Harris
(74) *Attorney, Agent, or Firm* — Winston Hsu

(57) ABSTRACT

An industrial emergency lighting device includes a driving module, a light-emitting module, a charging module, a rechargeable power source module, a power supply detecting module and a control module. The driving module, charging module and power supply detecting module are connected to an external power source. The light-emitting module is connected to the driving module. The rechargeable power source module is connected to the charging module and light-emitting module. The control module is connected to the driving module, power supply detecting module and rechargeable power source module. The power supply detecting module detects the input voltage of the external power source. When determining that the input voltage is low-level, the control module triggers a storage mode counting process. When determining that the number of the voltage changes of the input voltage reaches a predetermined number of times during a predetermined time period, the control module enters a sleep mode.

9 Claims, 3 Drawing Sheets

INDUSTRIAL EMERGENCY LIGHTING DEVICE HAVING STORAGE MODE TRIGGERING CIRCUIT

BACKGROUND OF THE INVENTION

1. Field of the Invention

The present invention relates to a lighting device, in particular to an industrial emergency lighting device having storage mode triggering circuit.

2. Description of the Prior Art

Industrial lighting devices (such as explosion-proof lamps, etc.) are usually used in workplaces full of flammable gases or dust (such as mines, oil fields, factories, etc.). Industrial lighting devices can prevent the ignition of flammable gases and dust in these workplaces in order to prevent from incurring danger.

However, currently available industrial lighting devices can only provide the lighting function, but cannot provide the emergency lighting function to help workers leave their workplaces quickly when a power outage occurs.

In addition, a currently available industrial lighting device usually has a switch or a wireless remote-control module, and the user can turn off the industrial lighting device via the switch or the wireless remote-control module, so that the industrial lighting device will not be turned on by mistake during transportation or when placed in a warehouse. However, the above-mentioned component (the switch or the wireless remote-control module) will reduce the explosion-proof level of the industrial lighting device, and cannot meet the requirements of the international or national safety standards.

SUMMARY OF THE INVENTION

One embodiment of the present invention provides an industrial emergency lighting device having storage mode triggering circuit, which includes a driving module, a light-emitting module, a charging module, a rechargeable power source module, a power supply detecting module and a control module. The driving module is connected to an external power source. The light-emitting module is connected to the driving module. The charging module is connected to the external power source. The rechargeable power source module is connected to the charging module and the light-emitting module. The power supply detecting module is connected to the external power source. The control module is connected to the driving module, the power supply detecting module and the rechargeable power source module. The power supply detecting module detects the input voltage of the external power source. When the control module determines that the input voltage is low-level, the control module triggers a storage mode counting process. When the control module determines that the number of the voltage changes of the input voltage reaches a predetermined number of times during a predetermined time period, the control module enters a sleep mode.

In one embodiment, after the control module enters the sleep mode, the control module decreases a standby current of the rechargeable power source module, turns off the light-emitting module and disconnects the rechargeable power source module from the light-emitting module.

In one embodiment, the control module interrupts the storage mode counting process and continues to detect the input voltage of the external power source via the power supply detecting module when the control module determines that the number of the voltage changes of the input voltage of the external power source exceeds or fails to reach the predetermined number of times during the predetermined time period.

In one embodiment, the industrial emergency lighting device further includes a rectifying and filtering module. The driving module and the charging module are connected to the external power source via the rectifying and filtering module.

In one embodiment, the industrial emergency lighting device further includes a voltage converting module. The rechargeable power source module is connected to the light-emitting module via the voltage converting module.

In one embodiment, the charging module is connected to the control module via the power supply detecting module. The power supply detecting module detects the charging voltage of the charging module. When the control module determines that the charging voltage of the charging module is low-level, the control module triggers the storage mode counting process. When the control module determines that the number of the voltage changes of the charging voltage of the charging module reaches the predetermined number of times during the predetermined time period, the control module enters the sleep mode.

In one embodiment, when the control module determines that the number of the voltage changes of the charging voltage of the charging module exceeds or fails to reach the predetermined number of times during the predetermined time period, the control module interrupts the storage mode counting process and continues to detect the charging voltage of the charging module via the power supply detecting module.

In one embodiment, the industrial emergency lighting device further includes a rechargeable power source voltage detecting module. The rechargeable power source module is connected to the driving module via the rechargeable power source voltage detecting module and detects the voltage of the rechargeable power source module. When the control module determines that the voltage of the rechargeable power source module is less than a predetermined over-discharge voltage value, the control module performs a low volage protection process.

In one embodiment, when the control module is executing the low voltage protection process, the control module controls the light-emitting module to enter an alarm mode during a predetermined alarm time period.

In one embodiment, the control module disconnects the rechargeable power source module from the light-emitting module and then enters the sleep mode after the predetermined alarm time period.

The industrial emergency lighting device having storage mode triggering circuit in accordance with the embodiments of the present invention may have the following advantages:

(1) In one embodiment of the present invention, the industrial emergency lighting device has a power supply detecting module capable of detecting the input voltage of an external power source. The control module can trigger a storage mode counting process when determining that the input voltage of the external power source is low-level. Then, the control module can enter a sleep mode when determining that the number of the voltage changes of the input voltage reaches a predetermined number of times during a predetermined time period. Accordingly, the user can actively control the industrial emergency lighting device to enter the sleep mode via an external switch (e.g., wall switch). Via the above storage mode counting process, the industrial emergency lighting device can provide an active storage mode triggering mechanism, which can effectively avoid that the industrial emergency lighting device is turned on by mistake during the transportation or when placed in a warehouse. Thus, the industrial emergency lighting device will not be damaged or malfunction during transportation or when placed in the warehouse.

(2) In one embodiment of the present invention, the industrial emergency lighting device can execute the storage mode counting process, so the industrial emergency lighting device can provide the active storage mode triggering mechanism. The above active storage mode triggering mechanism can effectively avoid that the industrial emergency lighting device is turned on by mistake during the transportation or when placed in the warehouse without a switch or a wireless remote-control module. Therefore, the explosion-proof level of the industrial emergency lighting device can be significantly increased so as to conform to the requirements of the international or national safety standards.

(3) In one embodiment of the present invention, the industrial emergency lighting device can provide not only the normal lighting mode, but also the emergency lighting mode. Thus, the industrial emergency lighting device can not only provide the lighting function when the utility power normally operates, but also can provide the emergency lighting function when the utility power malfunctions. As a result, the function of the industrial emergency lighting device can be further enhanced, so the industrial emergency lighting device can be more comprehensively in application.

(4) In one embodiment of the present invention, the industrial emergency lighting device has a rechargeable power source voltage detecting module, which can detect the voltage of the rechargeable power source module. The control module can execute a low voltage protection process when determining that the voltage of the rechargeable power source module is less than a predetermined over-discharge voltage value so as to disconnect the rechargeable power source module from the light-emitting module. Thus, the industrial emergency lighting device can provide the low voltage protection function with a view to effectively extending the service life of the rechargeable power source module.

(5) In one embodiment of the present invention, the industrial emergency lighting device can perform the low voltage protection process in order to control the light-emitting module to enter the alarm mode during a predetermined alarm time period. Accordingly, the industrial emergency lighting device can further provide the alarm function so as to remind the user of taking necessary measures when the voltage of the rechargeable power source module is too low. The above mechanism can effectively extend the service life of the rechargeable power source module, so the reliability of the industrial emergency lighting device can be further enhanced.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
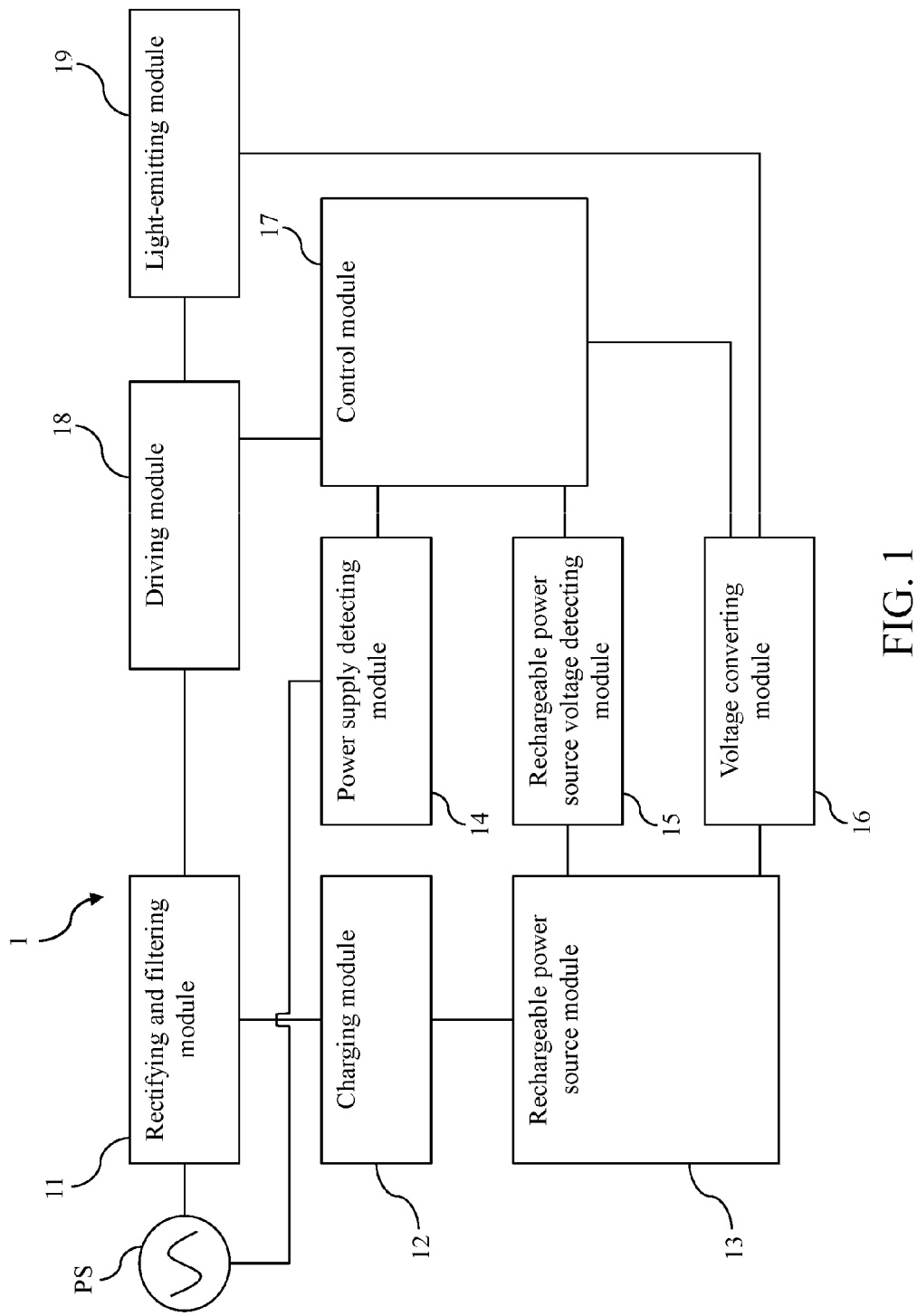
FIG. 1 is a block diagram of a circuit structure of an industrial emergency lighting device having storage mode triggering circuit in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1, which is a block diagram of a circuit structure of an industrial emergency lighting device having storage mode triggering circuit in accordance with one embodiment of the present invention. As shown in FIG. 1, the industrial emergency lighting device 1 includes a rectifying and filtering module 11, a charging module 12, a rechargeable power source module 13, a power supply detecting module 14, a rechargeable power source voltage detecting module 15, a voltage converting module 16, a control module 17, a driving module 18 and a light-emitting module 19.

The rectifying and filtering module 11 is connected to an external power source PS. In one embodiment, the rectifying and filtering module 11 may include a rectifier circuit (e.g., a full-bridge rectifier, a half-bridge rectifier, etc.), a filter circuit and other necessary circuits. In one embodiment, the external power source PS may be a utility power, an AC generator or other currently available power sources.

The driving module 18 is connected to the rectifying and filtering module 11. The rectifying and filtering module 11 receives the input voltage of the external power source PS to generate an output voltage in order to power the driving module 18. In one embodiment, the driving module 18 may be a light-emitting diode (LED) driver or the drivers of other currently available power sources.

The light-emitting module 19 is connected to the driving module 18. In one embodiment, the light-emitting module 19 may be a LED, a fluorescent light or other currently available power sources.

The charging module 12 is connected to the rectifying and filtering module 11 and the rechargeable power source module 13. The charging module 12 receives the output voltage of the rectifying and filtering module 11 so as to charge the rechargeable power source module 13. Thus, when the external power source PS is in normal state, the industrial emergency lighting device 1 can simultaneously perform the charging mode in order to charge the rechargeable power source module 13. In one embodiment, the charging module 12 may include a charging circuit and other necessary circuits.

The control module 17 is connected to the external power source PS via the power supply detecting module 16, and connected to the rechargeable power source module 13 via the rechargeable power source voltage detecting module 15 and the voltage converting module 16. When the control module 17 detects the input voltage of the external power source PS via the power supply detecting module 14 and determines that the external power source PS (utility power) is in normal state, the control module 17 controls the driving module 18 to generate a driving signal. Then, the light-emitting module 19 receives the driving signal generated by the driving module 18. In this way, the light-emitting module 19 can be driven by the driving module 18 to emit light. Therefore, the industrial emergency lighting device 1 can provide a normal lighting mode in order to provide the lighting function when the external power source PS in normal state.

Further, the rechargeable power source voltage detecting module 15 can detect the voltage of the rechargeable power source module 13. The control module 17 can execute a low voltage protection process when determining that the voltage, detected by the rechargeable power source voltage detecting module 15, of the rechargeable power source module 13 is less than a predetermined over-discharge voltage value. In one embodiment, the control module 17 may be a microcontroller unit (MCU), a central-processing unit (CPU), an application specific integrated circuit (ASIC), a field programmable gate array (FPGA) or other similar components. In one embodiment, the voltage converting module 16 may be a boost converter, a buck-boost converter or other similar components. In one embodiment, the rechargeable power source module 13 may be a Lithium battery, a Lithium iron phosphate battery, Ni-MH battery or other similar components.

The rechargeable power source module 13 is further connected to the light-emitting module 19 via the voltage converting module 16. When the control module 17 detects the input voltage of the external power source PS via the power supply detecting module 14 and determines that the external power source PS is in abnormal state, the control module 17 turns on the voltage converting module 16. Accordingly, the rechargeable power source module 13 can power the light-emitting module 19 via the voltage converting module 16. In this way, the light-emitting module 19 can be driven by the voltage converting module 16 to emit light. As a result, the industrial emergency lighting device 1 can provide an emergency lighting mode with a view to providing the lighting function when the external power source PS is abnormal state.

In this embodiment, the industrial emergency lighting device 1 can provide an active storage mode triggering mechanism. The user can actively trigger the storage mode of the industrial emergency lighting device 1 via an external switch (e.g., wall switch), such that the industrial emergency lighting device 1 can enter a state suitable for storage or transportation. The power supply detecting module 14 detects the input voltage of the external power source PS. When the user turns off the external switch and then the control module 17 determines that the input voltage of the external power source PS is low-level, the control module 17 triggers a storage mode counting process. The user can repeatedly turn on and turn off the external switch for several times during a predetermined time period. In this way, the input voltage of the external power source PS will change between high level and low level for several times. When the control module 17 determines that the number of voltage changes of the input voltage of the external power source PS reaches a predetermined number of times during a predetermined time period, the control module 17 enters a sleep mode. On the contrary, the control module 17 interrupts the storage mode counting process and continues to detect the input voltage of the external power source PS via the power supply detecting module 14 when the control module 17 determines that the number of the voltage changes of the input voltage of the external power source PS exceeds or fails to reach the predetermined number of times during the predetermined time period.

For instance, if the predetermined time period is 2 seconds and the predetermined number of times is 3 times. When the control module 17 determines that the input voltage of the external power source PS change from low level to high level, the control module 17 adds 1 to the counting value and determines whether the predetermined time period passes. If the control module 17 determines that the predetermined time period does not pass, the control module 17 continues to perform counting. The control module 17 stops counting until the predetermined time period passes. Afterward, if the control module 17 determines that the number of voltage changes of the input voltage of the external power source PS reaches 3 times, the control module 17 enters the sleep mode. If the control module 17 determines that determines that the number of the voltage changes of the input voltage of the external power source PS exceeds or fails to reach 3 times, the control module 17 interrupts the storage mode counting process and continues to detect the input voltage of the external power source PS via the power supply detecting module 14. The above predetermined time period and predetermined number of times can be adjusted according to actual requirements.

After the control module 17 enters the sleep mode, the control module 17 can reduce the standby current of the rechargeable power source module 13 and turn off the light-emitting module 19. In the meanwhile, the control module 17 turns off the voltage converting module 16 in order to disconnect the rechargeable power source module 13 from the light-emitting module 19.

When the control module 17 detects the high-level input voltage of the external power source PS again during the sleep mode, the control module 17 determines that the industrial emergency lighting device 1 has been connected to the external power source PS and the external power source PS is in normal state. Then, the control module 17 can interrupt the sleep mode, so the industrial emergency lighting device 1 can return to the normal lighting mode again and simultaneously execute the charging mode.

As set forth above, the user can actively control the industrial emergency lighting device 1 to enter the sleep mode via an external switch (e.g., wall switch). Via the above storage mode counting process, the industrial emergency lighting device 1 can provide an active storage mode triggering mechanism, which can effectively avoid that the industrial emergency lighting device 1 is turned on by mistake during the transportation or when placed in a warehouse. Thus, the industrial emergency lighting device 1 will not be damaged or malfunction during transportation or when placed in the warehouse.

Besides, the above active storage mode triggering mechanism can effectively avoid that the industrial emergency lighting device 1 is turned on by mistake during the transportation or when placed in the warehouse without a switch or a wireless remote-control module. Therefore, the explosion-proof level of the industrial emergency lighting device 1 can be significantly increased so as to conform to the requirements of the international or national safety standards.

Further, the industrial emergency lighting device 1 can provide not only the normal lighting mode, but also the emergency lighting mode. Thus, the industrial emergency lighting device 1 can not only provide the lighting function when the external power source PS (utility power) normally operates, but also can provide the emergency lighting function during power outage because the external power source PS malfunctions. As a result, the function of the industrial emergency lighting device 1 can be further enhanced, so the industrial emergency lighting device 1 can be more comprehensively in application.

The embodiment just exemplifies the present invention and is not intended to limit the scope of the present invention; any equivalent modification and variation according to the spirit of the present invention is to be also included within the scope of the following claims and their equivalents.

Figure 2:
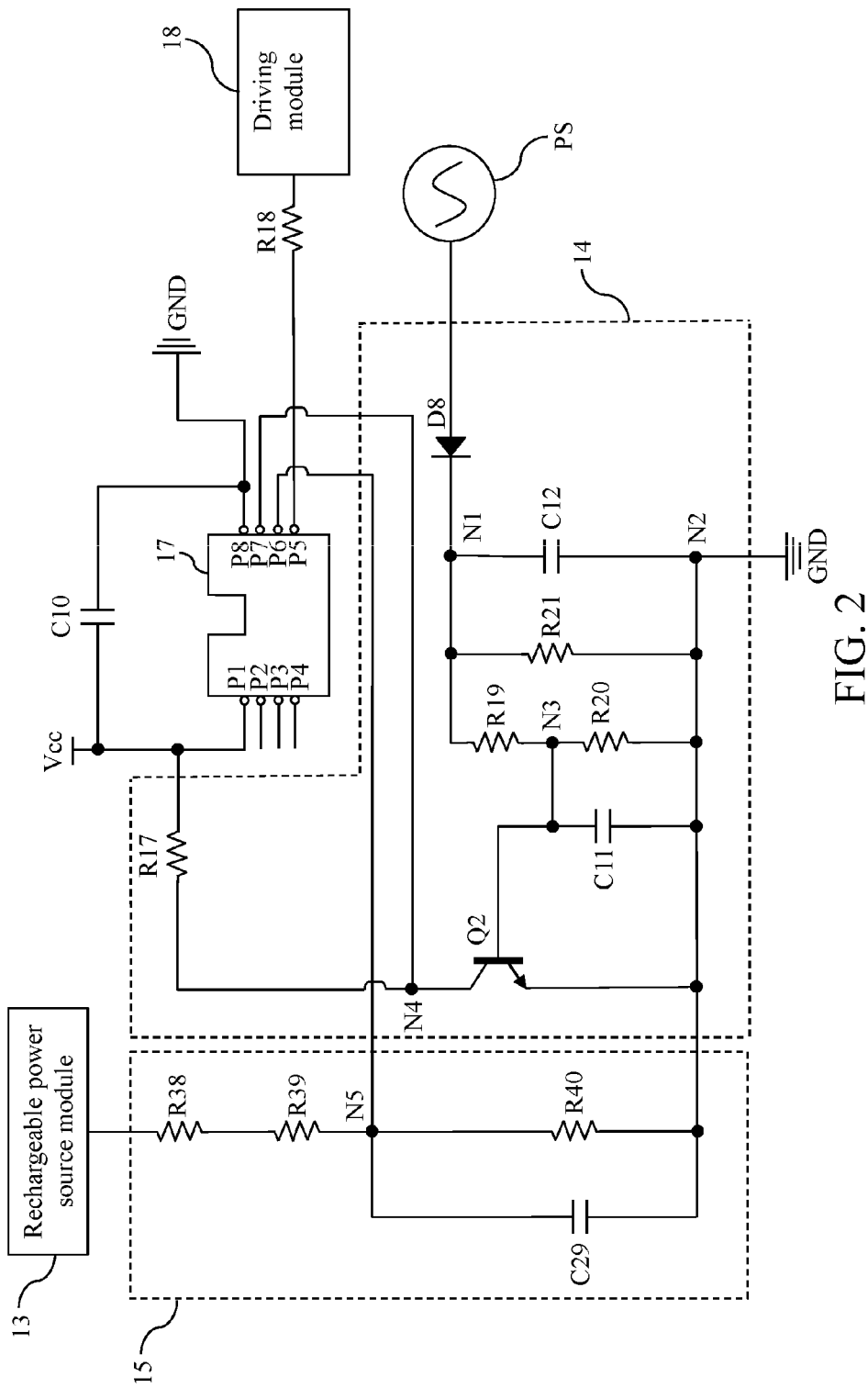
FIG. 2 is a circuit diagram of a power supply detecting module and a rechargeable power source detecting module of the industrial emergency lighting device having storage mode triggering circuit in accordance with one embodiment of the present invention.

Please refer to FIG. 2, which is a circuit diagram of a power supply detecting module and a rechargeable power source detecting module of the industrial emergency lighting device having storage mode triggering circuit in accordance with one embodiment of the present invention. As shown in FIG. 2, The power supply detecting module 14 has a first capacitor C11, a second capacitor C12, a first pull-up resistor R17, a first resistor R19, a second resistor R20, a third resistor R21, a diode D8 and a switch Q2. The power supply detecting module 14 has a first node N1, a second node N2, a third node N3 and a fourth node N4. The first node N1 is connected to the negative electrode of the diode D8 and the positive electrode of the diode D8 is connected to the external power source PS. The second node N2 is connected to the grounding point GND. One end of the second capacitor C12 is connected to the first node N1 and the other end of the second capacitor C12 is connected to the second node N2. One end of the third resistor R21 is connected to the first node N1 and the other end of the third resistor R21 is connected to the second node N2. One end of the first resistor R19 is connected to the first node N1 and the other end of the first resistor R19 is connected to the third node N3. One end of the second resistor R20 is connected to the third node N3 and the other end of the second resistor R20 is connected to the second node N2. One end of the first capacitor C11 is connected to the third node N3 and the other end of the first capacitor C11 is connected to the second node N2. The switch Q2 may be a bipolar junction transistor (BJT); the base of the switch Q2 is connected to the third node N3; the collector of the switch Q2 is connected to the fourth node N4; the emitter of the switch Q2 is connected to the second node N2. One end of the pull-up resistor R17 is connected to the fourth node N4 and the other end of the pull-up resistor R17 is connected to the operating voltage source Vcc.

The control module 17 has a first pin P1, a second pin P2, a third pin P3, a fourth pin P4, a fifth pin P5, a sixth pin P6, a seventh pin P7 and an eighth pin P8. The first pin P1 is connected to the operating voltage source Vcc. The eighth pin P8 is connected to the grounding point GND. There is a third capacitor C10 disposed between the first pin P1 and the eighth pin P8. The fifth pin P5 is connected to the driving module 18 via an output resistor R18, so the control module 17 can control the driving module 18. The seventh pin P7 is connected to the fourth node N4.

When the external power source PS normally operates, the input voltage of the external power source is high-level. At this moment, the diode D8 is in on state, and the first resistor R19 and he second resistor R20 can provide the voltage dividing effect, such that there is a voltage difference between the third node N3 and the second node N2. Meanwhile, the switch Q2 is turned on and the voltage detected by the eighth pin P8 is low-level. In this case, the control module 17 determines that the input voltage of the external power source PS is high-level and the external power source PS normally operates. In this embodiment, the first capacitor C11 and the second capacitor C12 provide the voltage stabilizing effect, and the third resistor R21 is a discharge resistor.

On the contrary, when the external power source PS is in abnormal state (or fails to be connected to the industrial emergency lighting device 1), the input voltage of the external power source PS is low-level. The switch Q2 is turned off to be in off state. In this case, the voltage detected by the eighth pin P8 detects is high-level (the voltage of the other end of the pull-up resistor R17). As a result, the control module 17 determines that the input voltage of the external power source PS is low-level and the external power source PS is in abnormal state.

The rechargeable power source voltage detecting module 15 has a fourth resistor R38, a fifth resistor R39, a sixth resistor R40 and a fourth capacitor C29. One end of the fourth resistor R38 is connected to the rechargeable power source module 13 and the other end of the fourth resistor R38 is connected to one end of the fifth resistor R39. The other end of the fifth resistor R39 is connected to the first node N5 and the first node N5 is connected to the fifth pin P5. One end of the sixth resistor R40 is connected to the fifth node N5 and the other end of the sixth resistor R40 is connected to the second node N2. one end of the fourth capacitor C29 is connected to the fifth node N5 and the other end of the fourth capacitor C29 is connected to the second node N2.

Via the above circuit design, the rechargeable power source voltage detecting module 15 can detect the voltage of the rechargeable power source module 13. When the control module 17 determines that the rechargeable power source voltage detecting module 15 detects that the voltage of the rechargeable power source module 13 is less than the predetermined over-discharge voltage value, the control module 17 can perform the low voltage protection process. When performing the low voltage protection process, the control module 17 transmits a low-frequency signal to the voltage converting module 16 so as to control the light-emitting module 19 to enter the alarm mode (for example, the light-emitting module 19 flashes.) during the predetermined alarm time period (e.g., 1 minute, 2 minutes, etc.). Afterward, the control module 17 turns off the voltage converting module 16 after the predetermined alarm time period passes so as to disconnect the rechargeable power source module 13 from the light-emitting module 19, and then enter the sleep mode.

The embodiment just exemplifies the present invention and is not intended to limit the scope of the present invention; any equivalent modification and variation according to the spirit of the present invention is to be also included within the scope of the following claims and their equivalents.

It is worthy to point out that the currently available industrial lighting device can only provide the lighting function, but cannot provide the emergency lighting function to help workers leave their workplaces quickly when a power outage occurs. In addition, the currently available industrial lighting device usually has a switch or a wireless remote-control module, and the user can turnoff the industrial lighting device via the switch or the wireless remote-control module, so that the industrial lighting device will not be turned on by mistake during transportation or when placed in a warehouse. However, the above-mentioned component will reduce the explosion-proof level of the industrial lighting device, and cannot meet the requirements of the international or national safety standards. On the contrary, according to one embodiment of the present invention, the industrial emergency lighting device has a power supply detecting module capable of detecting the input voltage of an external power source. The control module can trigger a storage mode counting process when determining that the input voltage of the external power source is low-level. Then, the control module can enter a sleep mode when determining that the number of the voltage changes of the input voltage reaches a predetermined number of times during a predetermined time period. Accordingly, the user can actively control the industrial emergency lighting device to enter the sleep mode via an external switch (e.g., wall switch). Via the above storage mode counting process, the industrial emergency lighting device can provide an active storage mode triggering mechanism, which can effectively avoid that the industrial emergency lighting device is turned on by mistake during the transportation or when placed in a warehouse. Thus, the industrial emergency lighting device will not be damaged or malfunction during transportation or when placed in the warehouse.

Also, according to one embodiment of the present invention, the industrial emergency lighting device can execute the storage mode counting process, so the industrial emergency lighting device can provide the active storage mode triggering mechanism. The above active storage mode triggering mechanism can effectively avoid that the industrial emergency lighting device is turned on by mistake during the transportation or when placed in the warehouse without a switch or a wireless remote-control module. Therefore, the explosion-proof level of the industrial emergency lighting device can be significantly increased so as to conform to the requirements of the international or national safety standards.

Further, according to one embodiment of the present invention, the industrial emergency lighting device can provide not only the normal lighting mode, but also the emergency lighting mode. Thus, the industrial emergency lighting device can not only provide the lighting function when the utility power normally operates, but also can provide the emergency lighting function when the utility power malfunctions. As a result, the function of the industrial emergency lighting device can be further enhanced, so the industrial emergency lighting device can be more comprehensively in application.

Moreover, according to one embodiment of the present invention, the industrial emergency lighting device has a rechargeable power source voltage detecting module, which can detect the voltage of the rechargeable power source module. The control module can execute a low voltage protection process when determining that the voltage of the rechargeable power source module is less than a predetermined over-discharge voltage value so as to disconnect the rechargeable power source module from the light-emitting module. Thus, the industrial emergency lighting device can provide the low voltage protection function with a view to effectively extending the service life of the rechargeable power source module.

Furthermore, according to one embodiment of the present invention, the industrial emergency lighting device can perform the low voltage protection process in order to control the light-emitting module to enter the alarm mode during a predetermined alarm time period. Accordingly, the industrial emergency lighting device can further provide the alarm function so as to remind the user of taking necessary measures when the voltage of the rechargeable power source module is too low. The above mechanism can effectively extend the service life of the rechargeable power source module, so the reliability of the industrial emergency lighting device can be further enhanced. As described above, the industrial emergency lighting device having storage mode triggering circuit according to the embodiments of the present invention can definitely achieve great technical effects.

Figure 3:
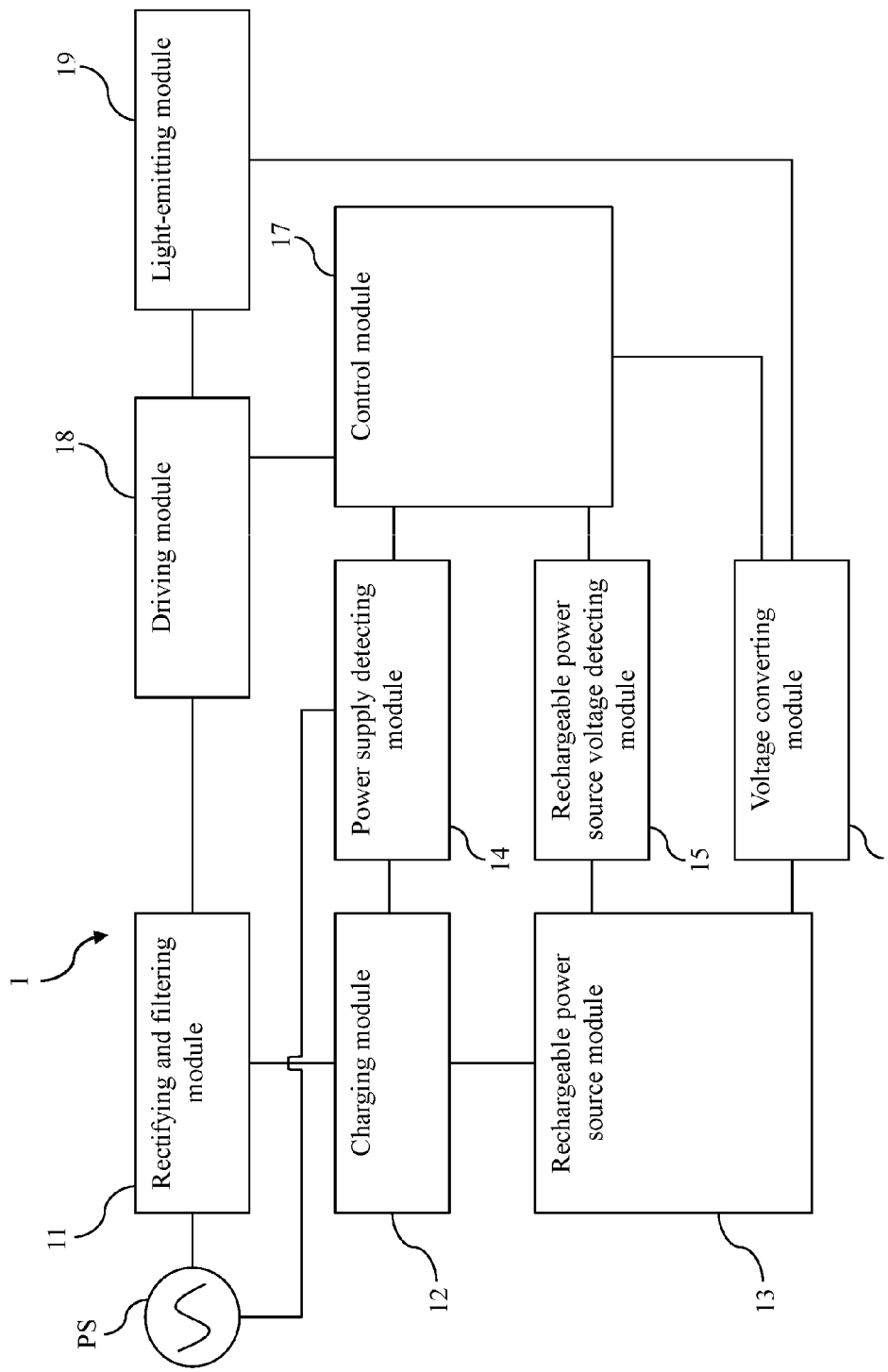
FIG. 3 is a block diagram of a circuit structure of an industrial emergency lighting device having storage mode triggering circuit in accordance with another embodiment of the present invention.

Please refer to FIG. 3, which is a block diagram of a circuit structure of an industrial emergency lighting device having storage mode triggering circuit in accordance with another embodiment of the present invention. As shown in FIG. 3, the industrial emergency lighting device 1 includes a rectifying and filtering module 11, a charging module 12, a rechargeable power source module 13, a power supply detecting module 14, a rechargeable power source voltage detecting module 15, a voltage converting module 16, a control module 17, a driving module 18 and a light-emitting module 19.

The above elements are similar to those of the previous embodiment, so will not be described herein again. The difference between this embodiment and the previous embodiment is that the charging module 12 can be connected to the power supply detecting module 14, so the charging module 12 can be connected to the control module 17 via the power supply detecting module 14. In this way, the control module 17 can detect the charging voltage of the charging module 12 in order to execute the active storage mode triggering mechanism.

The power supply detecting module 14 detects the charging voltage of the charging module 12. The control module 17 triggers the aforementioned storage mode counting process when determining that the charging voltage of the charging module 13 is low-level. Then, the control module 17 can enter the sleep mode when determining that the number of the voltage changes of the charging voltage of the charging module 13 reaches the predetermined number of times during the predetermined time period. On the contrary, if the control module 17 determines that the number of the voltage changes of the charging voltage of the charging module 13 exceeds or fails to reach the predetermined number of times during the predetermined time period, the control module 17 interrupts the storage mode counting process and continues to detect the charging voltage of the charging module 13 via the power supply detecting module 14.

Similarly, when the control module 17 enters the sleep mode, the control module 17 can reduce the standby current of the rechargeable power source module 13 and turn off the light-emitting module 19. In the meanwhile, the control module 17 turns off the voltage converting module 16 so as to disconnect the rechargeable power source module 13 from the light-emitting module 19.

When the control module 17 detects the input voltage of the external power source PS is high-level during the sleep mode, the control module 17 determines that the industrial emergency lighting device 1 has been connected to the external power source PS and the external power source PS is in normal state. Then, the control module 17 can interrupt the sleep mode, such that the industrial emergency lighting device 1 can return to the normal lighting mode and simultaneously perform the charging mode.

To sum up, according to one embodiment of the present invention, the industrial emergency lighting device has a power supply detecting module capable of detecting the input voltage of an external power source. The control module can trigger a storage mode counting process when determining that the input voltage of the external power source is low-level. Then, the control module can enter a sleep mode when determining that the number of the voltage changes of the input voltage reaches a predetermined number of times during a predetermined time period. Accordingly, the user can actively control the industrial emergency lighting device to enter the sleep mode via an external switch (e.g., wall switch). Via the above storage mode counting process, the industrial emergency lighting device can provide an active storage mode triggering mechanism, which can effectively avoid that the industrial emergency lighting device is turned on by mistake during the transportation or when placed in a warehouse. Thus, the industrial emergency lighting device will not be damaged or malfunction during transportation or when placed in the warehouse.

Also, according to one embodiment of the present invention, the industrial emergency lighting device can execute the storage mode counting process, so the industrial emergency lighting device can provide the active storage mode triggering mechanism. The above active storage mode triggering mechanism can effectively avoid that the industrial emergency lighting device is turned on by mistake during the transportation or when placed in the warehouse without a switch or a wireless remote-control module (e.g., a remote controller, a smart phone, a tablet computer, etc.). Therefore, the explosion-proof level of the industrial emergency lighting device can be significantly increased so as to conform to the requirements of the international or national safety standards.

Further, according to one embodiment of the present invention, the industrial emergency lighting device can provide not only the normal lighting mode, but also the emergency lighting mode. Thus, the industrial emergency lighting device can not only provide the lighting function when the utility power normally operates, but also can provide the emergency lighting function when the utility power malfunctions. As a result, the function of the industrial emergency lighting device can be further enhanced, so the industrial emergency lighting device can be more comprehensively in application.

Moreover, according to one embodiment of the present invention, the industrial emergency lighting device has a rechargeable power source voltage detecting module, which can detect the voltage of the rechargeable power source module. The control module can execute a low voltage protection process when determining that the voltage of the rechargeable power source module is less than a predetermined over-discharge voltage value so as to disconnect the rechargeable power source module from the light-emitting module. Thus, the industrial emergency lighting device can provide the low voltage protection function with a view to effectively extending the service life of the rechargeable power source module.

Furthermore, according to one embodiment of the present invention, the industrial emergency lighting device can perform the low voltage protection process in order to control the light-emitting module to enter the alarm mode during a predetermined alarm time period. Accordingly, the industrial emergency lighting device can further provide the alarm function so as to remind the user of taking necessary measures when the voltage of the rechargeable power source module is too low. The above mechanism can effectively extend the service life of the rechargeable power source module, so the reliability of the industrial emergency lighting device can be further enhanced.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An industrial emergency lighting device having a storage mode triggering circuit, comprising:
    a driving module connected to an external power source;
    a light-emitting module connected to the driving module;
    a charging module connected to the external power source;
    a rechargeable power source module connected to the charging module and the light-emitting module;
    a power supply detecting module connected to the external power source; and
    a control module connected to the driving module, the power supply detecting module and the rechargeable power source module;
    wherein the power supply detecting module is configured to detect an input voltage of the external power source, wherein when the control module determines that the input voltage is low-level, the control module is configured to trigger a storage mode counting process, wherein when the control module determines that a number of voltage changes of the input voltage reaches a predetermined number of times during a predetermined time period, the control module is configured to enter a sleep mode wherein the charging module is connected to the control module via the power supply detecting module, wherein the power supply detecting module is configured to detect a charging voltage of the charging module, wherein when the control module determines that the charging voltage of the charging module is low-level, the control module is configured to trigger the storage mode counting process, wherein when the control module determines that a number of voltage changes of the charging voltage of the charging module reaches the predetermined number of times during the predetermined time period, the control module is configured to enter the sleep mode.

2. The industrial emergency lighting device having a storage mode triggering circuit as claimed in claim 1, wherein after the control module enters the sleep mode, the control module is configured to decrease a standby current of the rechargeable power source module, turn off the light-emitting module and disconnect the rechargeable power source module from the light-emitting module.

3. The industrial emergency lighting device having a storage mode triggering circuit as claimed in claim 1, wherein the control module is configured to interrupt the storage mode counting process and continue to detect the input voltage of the external power source via the power supply detecting module when the control module determines that the number of the voltage changes of the input voltage of the external power source exceeds or fails to reach the predetermined number of times during the predetermined time period.

4. The industrial emergency lighting device having a storage mode triggering circuit as claimed in claim 1, further comprising a rectifying and filtering module, wherein the driving module and the charging module are connected to the external power source via the rectifying and filtering module.

5. The industrial emergency lighting device having a storage mode triggering circuit as claimed in claim 1, further comprising a voltage converting module, wherein the rechargeable power source module is connected to the light-emitting module via the voltage converting module.

6. The industrial emergency lighting device having a storage mode triggering circuit as claimed in claim 1, wherein when the control module determines that the number of the voltage changes of the charging voltage of the charging module exceeds or fails to reach the predetermined number of times during the predetermined time period, the control module is configured to interrupt the storage mode counting process and continue to detect the charging voltage of the charging module via the power supply detecting module.

7. The industrial emergency lighting device having a storage mode triggering circuit as claimed in claim 1, further comprising a rechargeable power source voltage detecting module, wherein the rechargeable power source module is connected to the driving module via the rechargeable power source voltage detecting module, which is configured to detect a voltage of the rechargeable power source module, wherein when the control module determines that the voltage of the rechargeable power source module is less than a predetermined over-discharge voltage value, the control module is configured to perform a low voltage protection process.

8. The industrial emergency lighting device having a storage mode triggering circuit as claimed in claim 7, wherein when the control module is executing the low voltage protection process, the control module is configured to control the light-emitting module to enter an alarm mode during a predetermined alarm time period.

9. The industrial emergency lighting device having a storage mode triggering circuit as claimed in claim 8, wherein the control module is configured to disconnect the rechargeable power source module from the light-emitting module and then enter the sleep mode after the predetermined alarm time period.

* * * * *